United States Patent
Chang et al.

(10) Patent No.: US 9,851,496 B2
(45) Date of Patent: Dec. 26, 2017

(54) FRAME DEVICE FOR BACKLIGHT MODULE AND BACKLIGHT MODULE

(71) Applicant: Radiant Opto-Electronics Corporation, Kaohsiung (TW)

(72) Inventors: Cheng-Te Chang, Kaohsiung (TW); Ya-Ming Kuo, Kaohsiung (TW); Chi-Hung Huang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 72 days.

(21) Appl. No.: 14/989,656

(22) Filed: Jan. 6, 2016

(65) Prior Publication Data

US 2016/0195674 A1 Jul. 7, 2016

(30) Foreign Application Priority Data

Jan. 7, 2015 (TW) .............................. 104100381 A (51) Int. Cl.
*F21V 8/00* (2006.01)
(52) U.S. Cl.
CPC ......... *G02B 6/0088* (2013.01); *G02B 6/0091* (2013.01); *G02B 6/0085* (2013.01)
(58) Field of Classification Search
CPC ... G02B 6/0088; G02B 6/0091; G02B 6/0085
USPC ....................................................... 362/633
See application file for complete search history.

(56) References Cited

U.S. PATENT DOCUMENTS

| 2,791,681 A | * | 5/1957 | Dunker ..................... F21S 8/02 16/232 |
| 2008/0088764 A1 | | 4/2008 | Son |
| 2012/0092893 A1 | | 4/2012 | Cho et al. |

FOREIGN PATENT DOCUMENTS

| CN | 202328038 U | 7/2012 |
| CN | 102777815 A | 11/2012 |
| CN | 103955094 A | 7/2014 |
| CN | 204460107 U | 7/2015 |
| TW | 200736698 A | 10/2007 |
| TW | 201003231 A | 1/2010 |
| TW | 201200945 A | 1/2012 |

* cited by examiner

*Primary Examiner* — Karl D Frech
(74) *Attorney, Agent, or Firm* — Muncy, Geissler, Olds & Lowe, P.C.

(57) ABSTRACT

A frame device includes a first frame, a plurality of fasteners and an second frame. The first frame includes a base wall and a side wall extending transversely from one end of the base wall. The fasteners are disposed on the side wall opposite to the base wall. The second frame is assembled to and covers an upper end of the first frame and has a plurality of spaced-apart positioning holes. A portion of each fastener passes out of a respective positioning hole and presses against the second frame when the second frame is assembled to the first frame.

18 Claims, 7 Drawing Sheets

FRAME DEVICE FOR BACKLIGHT MODULE AND BACKLIGHT MODULE

CROSS-REFERENCE TO RELATED APPLICATION

This application claims priority of Taiwanese Application Number 104100381, filed on Jan. 7, 2015.

FIELD

The disclosure relates to a backlight module, more particularly to a frame device for a backlight module and a backlight module that applies the frame device.

BACKGROUND

Figure 1:
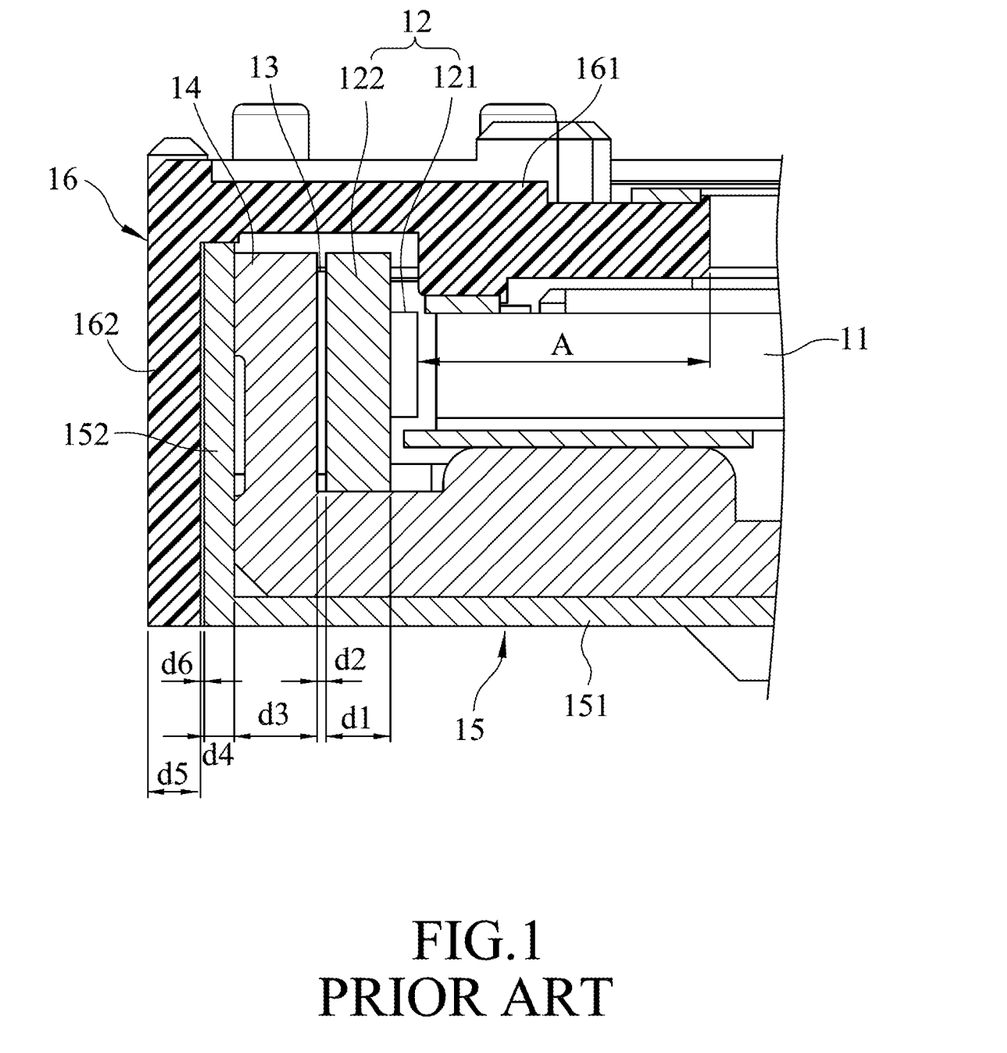
FIG. 1 is a fragmentary sectional view of a conventional side-edge type backlight module.

Referring to FIG. 1, a conventional side-edge type backlight module includes a light guide plate 11, a light bar 12 provided on a lateral side of the light guide plate 11, a plurality of thermally conductive sheets 13 adhered on the back of the light bar 12, a heat dissipating seat 14 connected to the thermally conductive sheets 13, a base frame 15 including a base wall 151 and a side wall 152 that cooperatively define a receiving space for receiving the light guide plate 11, the light bar 12 and the heat dissipating seat 14 therein, and a cover 16 including an upper plate 161 and a side plate 162 cooperatively covering the base frame 15. The light bar 12 is constructed by soldering a plurality of light-emitting diodes 121 (only one is shown) to a printed circuit board (PCB) 122.

Through the aforesaid structure of the conventional side light type backlight module, the thicknesses of the printed circuit board 122 of the light bar 12, the thermally conductive sheet 13, the heat dissipating seat 14, the side plate 152 of the base frame 15 and the side plate 162 of the cover 16 will lead to a wide border situation on four sides of the light guide plate 11. To illustrate with more details, as shown in Table 1 below, by means of actual measurement, the thickness (d1) of the printed circuit board 122 is approximately 1.7 mm, the thickness (d2) of the thermally conductive sheet 13 is approximately 0.25 mm, the thickness (d3) of the heat dissipating seat 14 is approximately 2.2 mm, the thickness (d4) of the side plate 152 of the base frame 15 is approximately 0.8 mm, the thickness (d5) of the side plate 162 of the cover 16 is approximately 1.4 mm, and the interval (d6) between the side plates 152, 162 of the base frame 15 and the cover 16 is approximately 0.1 mm, so that the overall thickness (i.e., d1+d2+d3+d4+d5+d6) is approximately 6.45 mm. It is evident that the overall volume and area of the conventional backlight module are increased, while the scope of the area thereof is reduced. Moreover, heat generated by the light bar 12 is firstly transmitted to the heat dissipating seat 14, and is then dissipated outward through the base frame 15 and the cover 16, so that the heat dissipation effect of the conventional backlight module is poor. Thus, how to make the border of the backlight module narrow, how to enlarge the scope of the area thereof and how to enhance the heat dissipation effect are issues that need to be resolved in the industry.

TABLE 1

| Component | Thickness (mm) |
| --- | --- |
| Printed circuit board (122) | 1.7 |

TABLE 1-continued

| Component | Thickness (mm) |
| --- | --- |
| Thermally conductive sheet (13) | 0.25 |
| Heat dissipating seat (14) | 2.2 |
| Side plate (152) of the base frame (15) | 0.8 |
| Side plate (162) of the cover (16) | 1.4 |
| Interval between the side plates (152, 162) of the base frame (15) and the cover (16) | 0.1 |
| Overall thickness | 6.45 |

SUMMARY

Therefore, an object of the present disclosure is to provide a frame device for a backlight module that has a narrow border and that can enhance the effect of heat dissipation.

Another object of the present disclosure is to provide a backlight module that has the aforesaid frame device.

According to one aspect of the present disclosure, a frame device for a backlight module comprises a first frame, a plurality of fasteners and a second frame. The first frame includes a base wall and a side wall extending transversely from one end of the base wall. The fasteners are disposed on the side wall opposite to the base wall. The second frame is assembled to and covers an upper end of the first frame and has a plurality of spaced-apart positioning holes. A portion of each the fasteners passes out of a respective one of the positioning holes and presses against the second frame when the second frame is assembled to the first frame.

According to another aspect of the present disclosure, a backlight module comprises a light bar, a light guide plate for receiving light emitted from the light bar, and a frame device. The frame device includes a first frame, a plurality of fasteners and a second frame. The first frame includes a base wall and a side wall extending transversely from one end of the base wall. The fasteners are disposed on the side wall opposite to the base wall. The second frame is assembled to and covers an upper end of the first frame and has a plurality of spaced-apart positioning holes. A portion of each the fasteners passes out of a respective one of the positioning holes and presses against the second frame when the second frame is assembled to the first frame.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present disclosure is described in greater detail with reference to the accompanying embodiments, it should be noted herein that like elements are denoted by the same reference numerals throughout the disclosure.

Figure 2:
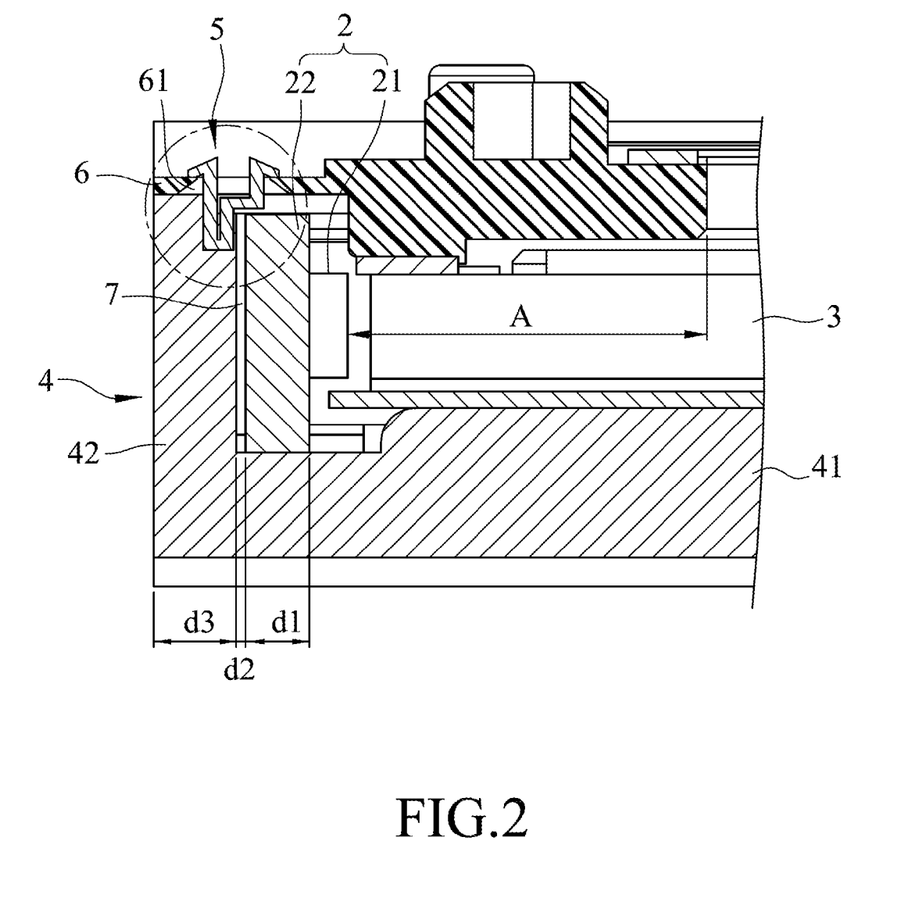
FIG. 2 is a fragmentary sectional view of the first embodiment of a backlight module according to the present disclosure.
Figure 3:
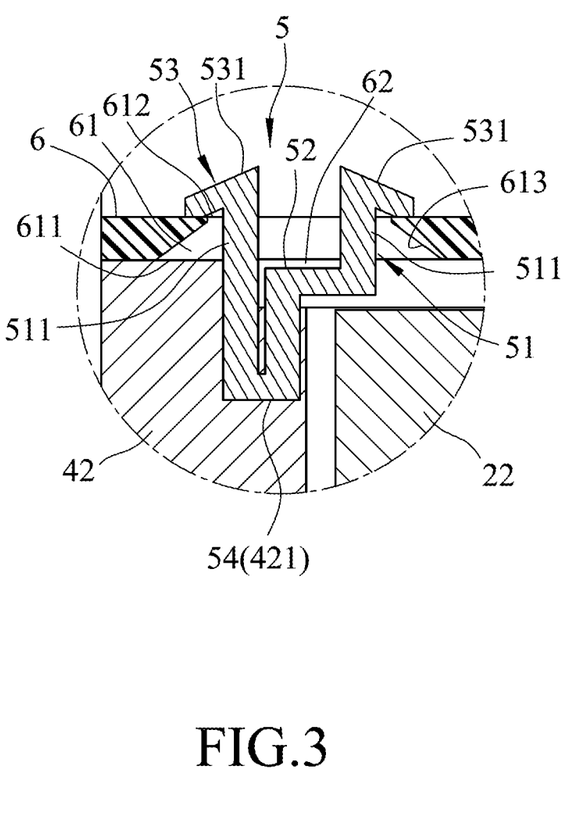
FIG. 3 is an enlarged sectional view of an encircled portion of FIG. 2.
Figure 4:
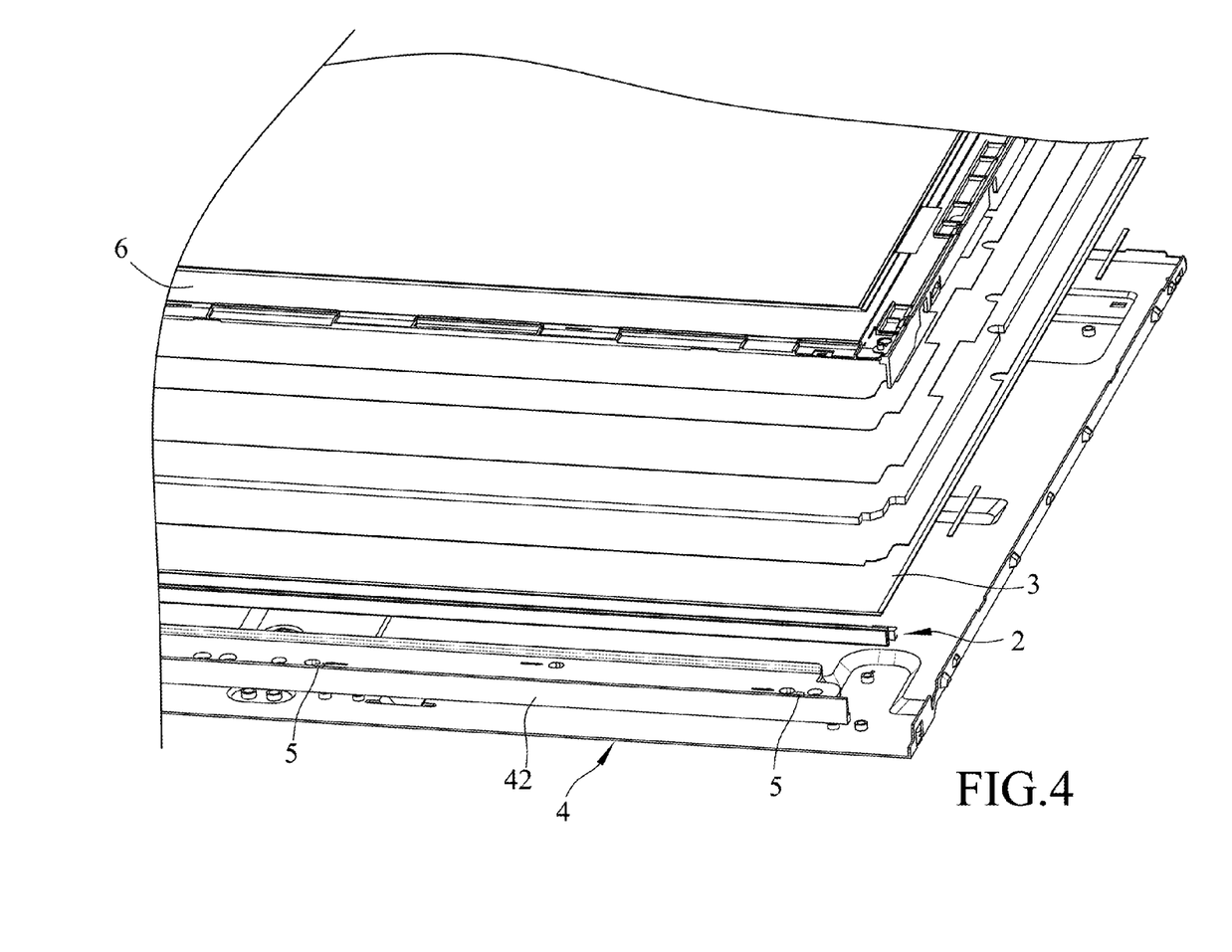
FIG. 4 is a fragmentary exploded perspective view of the first embodiment.
Figure 5:
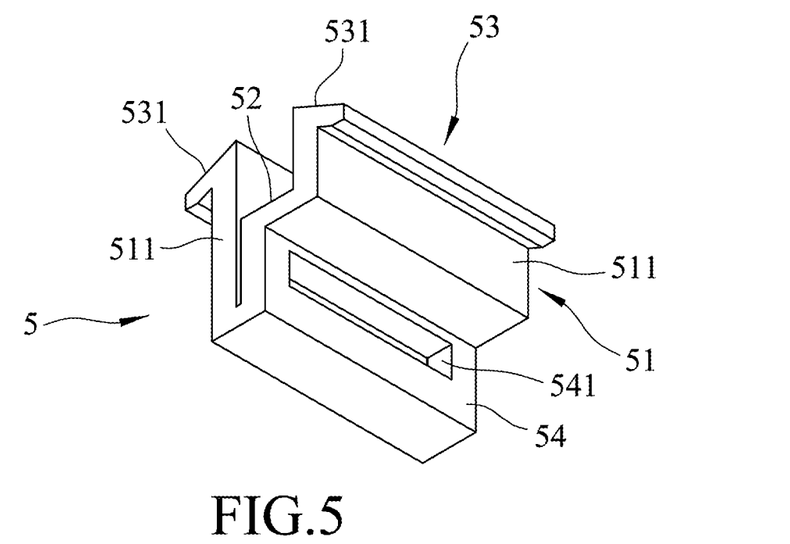
FIG. 5 is a perspective view of a fastener of a frame device of the backlight module according to the second embodiment of the present disclosure.
Figure 6:
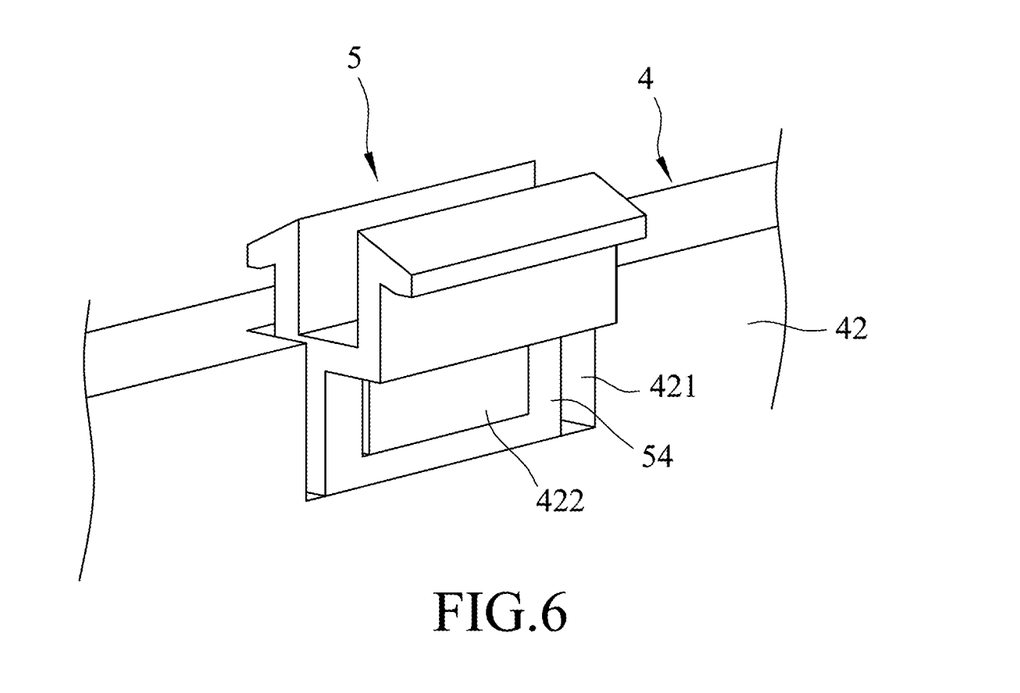
FIG. 6 is a fragmentary perspective view of the second embodiment, illustrating the fastener assembled to a side wall of the frame device.

Referring to FIGS. 2 to 4, the first embodiment of a backlight module according to the present disclosure is shown to comprise a light bar 2, a light guide plate 3, a frame device, and a thermally conductive sheet 7.

The light bar 2 includes a printed circuit board 22 and a plurality of light-emitting diodes 21 mounted on the printed circuit board 22. The light guide plate 3 receives light emitted from the light-emitting diodes 21. The frame device includes a first frame 4, a plurality of fasteners 5 and a second frame 6. The first frame 4 is made of metal, and has a good heat dissipation effect. The first frame 4 includes a base wall 41 and a side wall 42 extending from the base wall 41, preferably, the side wall 42 extends transversely from one end of the base wall 41. The side wall 42 is provided with a plurality of limiting grooves 421 that are spaced apart from each other along the length thereof. The light bar 2 and the light guide plate 3 are accommodated in the first frame 4.

The fasteners 5 are made of plastic, and are disposed on the side wall 42 opposite to the base wall 41. Each of the fasteners 5 includes an insert 51, a press portion 53 and a fixing portion 54. The insert 51 includes two spaced-apart insert portions 511. The connecting portion 52 has one end connected to an inner end of one of the insert portions 511, and another end extending toward the other insert portion 511. The connecting portion 52 cooperates with the insert portions 511 to define therebetween a groove with a substantially U-shaped cross section. The press portion 53 includes two press arms 531 extending downwardly, slantingly, oppositely and respectively from outer ends of the insert portions 511. The fixing portion 54 has a substantially U-shaped cross section, is disposed beneath the connecting portion 52 and is connected between the another end of the connecting portion 52 and an inner end of the other insert portion 51. The fixing portion 54 has a shape corresponding to that of a respective one of the limiting grooves 421, and is inserted into the respective limiting groove 421. In this embodiment, the fasteners 5 are integrated as one piece with the first frame 4 using an insert molding process.

The second frame 6 covers an upper end of the first frame 4, and has an inner surface abutting against an upper surface of the side wall 42, an outer surface opposite to the inner surface, and a plurality of positioning holes 61 (only one is shown in FIGS. 2 and 3) extending through the inner and outer surfaces of the second frame 6 and corresponding in position to the fasteners 5. In this embodiment, the positioning holes 61 of the second frame 6 are located above the side wall 42 and does not engage the side wall 42, and at least a portion of a lower end of each positioning hole 61 is contacting with an upper surface of the side wall 42. The insert portions 511 of each fastener 5 are inserted into a corresponding one of the positioning holes 61, and the press arms 531 extend out of the corresponding positioning hole 61 and press against the outer surface of the second frame 6 to position the second frame 6 to the first frame 4. In this embodiment, an upper end of the printed circuit board 22 is lower than that of the side wall 42 to define an accommodation space 62, preferably the accommodation space 62 communicates with the limiting grooves 421 and the positioning holes 61 and for accommodating the connecting portions 52 of the fasteners 5.

The thermally conductive sheet 7 is disposed between the printed circuit board 22 and the side wall 42.

Through the aforesaid structure of the present disclosure, the heat dissipating seat 14 and the cover 16 of the conventional side light type backlight module shown in FIG. 1 can be dispensed herewith, so that not only the number of the components and the cost of manufacturing are reduced, but also the border of the backlight module of the present disclosure is narrowed. As shown in the Table 2 below, by means of the actual measurement, the thickness (d1) of the printed circuit board 22 is approximately 1.7 mm, the thickness (d2) of the thermally conductive sheet 7 is approximately 0.25 mm, the thickness (d3) of the side wall 42 is approximately 2.2 mm, so that the overall thickness (d1+d2+d3) is approximately 4.15 mm.

In comparison with the overall thickness of the conventional backlight module (which is 6.45 mm, as shown in Table 1), the backlight module of this disclosure can indeed achieve the goal of narrowing the border of the backlight module and increasing an area thereof. Taking the conventional backlight module of FIG. 1 as an example, the area (A) (that is, the distance from a light-emitting surface of the light-emitting diode 121 to an inner edge of the upper plate 161, which is distal from the side wall 14) is 8.35 mm. Because the overall thickness of this disclosure is smaller than that of the conventional backlight module, and the light bar 2 is disposed farther from an inner edge of the second frame 6, which is distal from the side wall 42, the area (A) of this disclosure can be increased to 10.65 mm. As such, the value of (A) in the ratio A/P is increased, wherein (P) is the pitch between two adjacent light-emitting diodes 21. In other words, because the space for mixing the light emitted from the light-emitting diodes 21 is increased, hot spots can be minimized. Moreover, heat generated by the light bar 2 is directly transmitted to the first frame 4, and is directly dissipated outward. Hence, the heat dissipation effect of the present disclosure is excellent.

TABLE 2

| Component | Thickness (mm) |
| --- | --- |
| Printed circuit board (22) | 1.7 |
| Thermally conductive sheet (7) | 0.25 |
| Side wall (42) of the first frame (4) | 2.2 |
| Overall thickness | 4.15 |

Referring to FIGS. 5 to 8, the second embodiment of the backlight module of this disclosure is shown to be generally identical to the first embodiment, and only differs in that, in the second embodiment, the first frame 4 and the fasteners 5 are separate independent components. The fixing portion 54 of each fastener 5 is formed with a pair of aligned elongated passage holes 541 (only one is visible in FIG. 5). The side wall 42 of the first frame 4 is further provided with a plurality of protruding blocks 422 each of which projects into a respective limiting groove 421.

Figure 7:
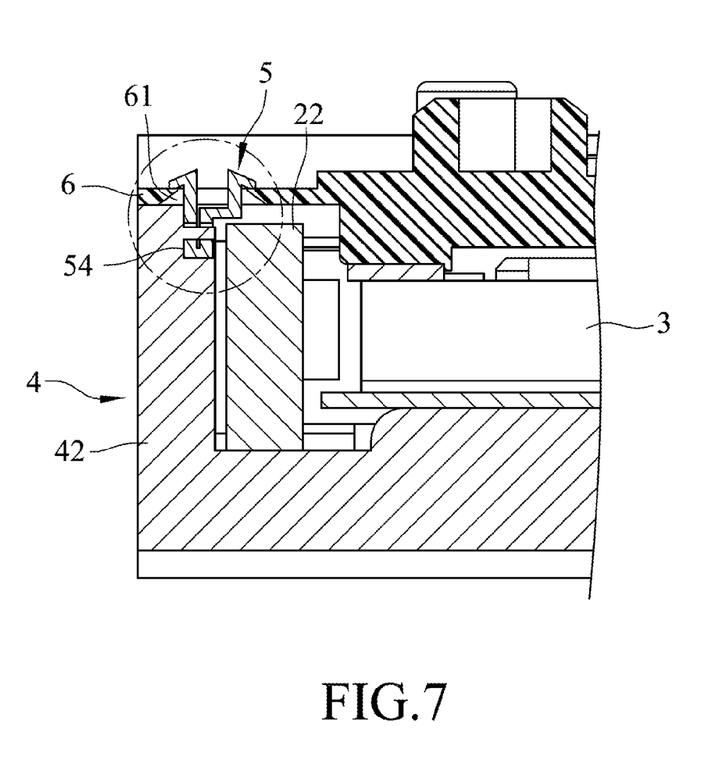
FIG. 7 is a fragmentary sectional view of the backlight module of the second embodiment.
Figure 8:
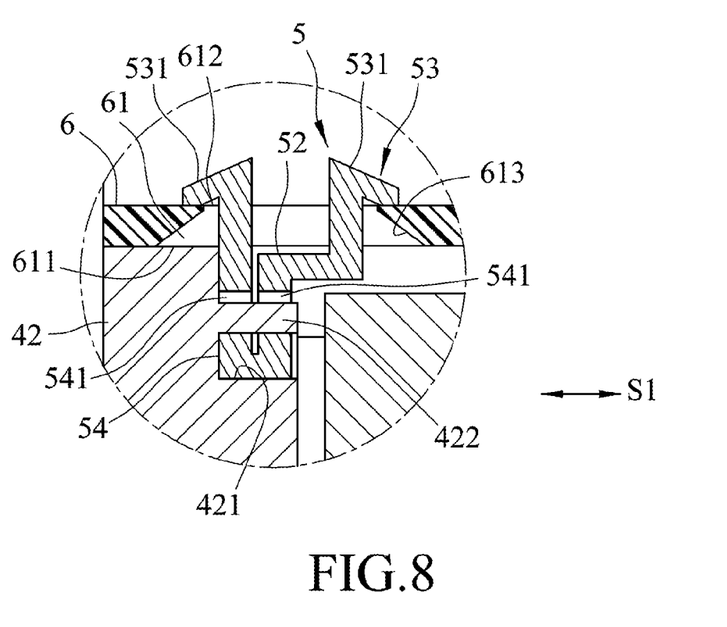
FIG. 8 is an enlarged sectional view of an encircled portion of FIG. 7.

With reference to FIG. 8, the fixing portion 54 of the fastener 5 is inserted into the limiting groove 421 along a first direction (S1), and the protruding block 422 passes into the pair of the passage holes 541 of the fixing portion 54, thereby positioning the fastener 5 to the side wall 42. The first direction (S1) is a direction extending along the thickness direction of the side wall 42. Prior to assembly of the second frame 6 to the first frame 4, each fastener 5 is restricted by the side wall 42 to move only in the first direction (S1). As shown in FIGS. 7 and 8, with the fixing portion 54 fitted into the limiting groove 421 and with the protruding block 422 inserted into the passage holes 541 of the fixing portion 54, upward and downward movement or any axis movement of the fastener 5 other than movement in the first direction (S1) are prevented. Furthermore, with the printed circuit board 22 blocking the side wall 42, movement of the fastener 5 along the first direction (S1) is also prevented. Thus, the heat dissipating seat 14 and the cover 16 of the conventional backlight module can be similarly dispensed herewith, and the number of the components and the cost of manufacturing of this embodiment can be similarly reduced. Further, the border of the backlight module of this embodiment can be narrowed, and the scope of the area thereof can be enlarged. Additionally, the backlight module of this embodiment also has excellent heat dissipation.

Figure 9:
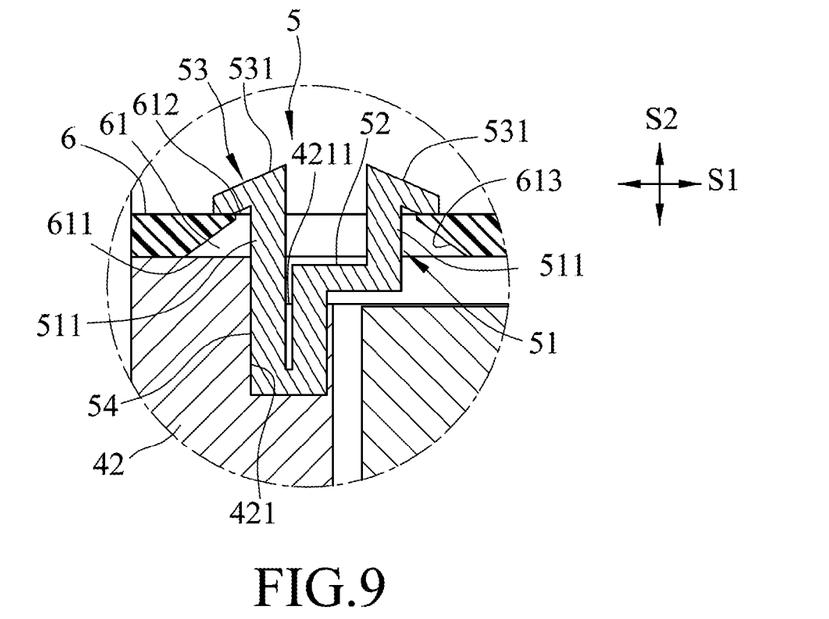
FIG. 9 is an enlarged fragmentary sectional view of a backlight module according to the third embodiment of the present disclosure.

Referring to FIG. 9, the third embodiment of the backlight module of this disclosure is shown to be generally identical to the second embodiment, and only differs in that, in the third embodiment, each limiting groove 421 of the first frame 4 has a substantially U-shaped cross section and an opening 4211 that faces upward. Further, the fixing portion 54 of each fastener 5 is not formed with the pair of the passage holes 541 (see FIG. 8), and has a shape corresponding to that of the respective limiting groove 421. Through this, the fixing portion 54 of each fastener 5 can be press-fitted into the respective limiting groove 421 through the opening 4211. Each fastener 5 is connected to the side wall 42 along a second direction (S2). The second direction (S2) is a direction that extends along the height direction of the side wall 42, and is transverse to the first direction (S1). Prior to assembly of the second frame 6 to the first frame 4, each fastener 5 is restricted by the side wall 42 to move only in the second direction (S2). When the second frame 6 is assembled to the first frame 4, the two press arms 531 of the press portion 53 of each fastener 5 pass through the respective positioning hole 61 in the second frame 6, and press against the outer surface of the second frame 6. Each fastener 5 is thus prevented from moving in the second direction (S2). The goals of the second embodiment can be similarly achieved in the third embodiment.

Figure 10:
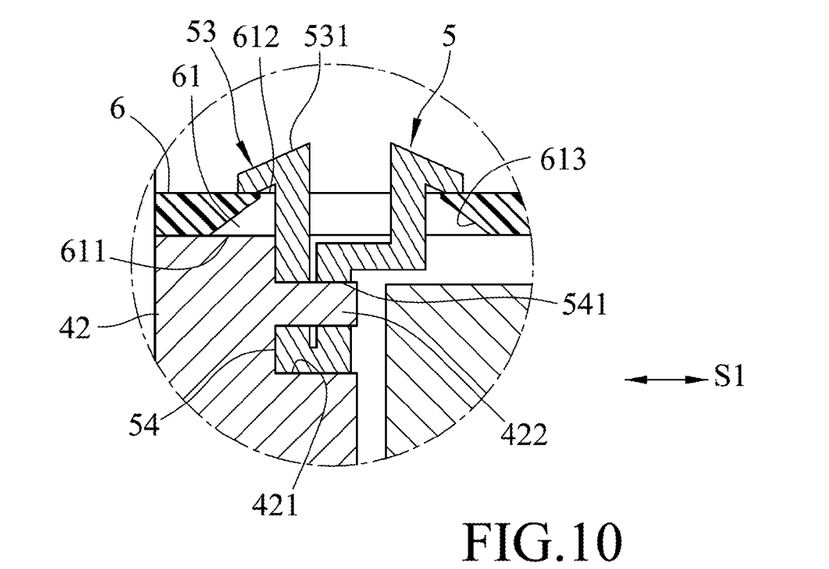
FIG. 10 is an enlarged fragmentary sectional view of a backlight module according to the fourth embodiment of the present disclosure.

Referring to FIG. 10, the fourth embodiment of the backlight module of this disclosure is shown to be similar to the second embodiment, and only differs in that, in the fourth embodiment, each protruding block 422 of the side wall 42 is press-fitted into the pair of the aligned elongated holes 541 of the fixing portion 54 of the respective fastener 5, so that there is no clearance between the protruding block 422 and the pair of the passage holes 541. Hence, an alternative form of positioning each fastener 5 to the side wall 42 is provided. The goals of the second embodiment can be similarly achieved using the fourth embodiment.

With reference to FIGS. 3 and 8 to 10, a hole wall of each positioning hole 61 of the second frame 6 in each of the aforesaid four embodiments has a tapered inclined surface 613 tapering from an entry opening 611 toward an exit opening 612 of the positioning hole 61. When the two press arms 531 of the press portion 53 of each fastener 5 pass through the corresponding positioning hole 61, the press arms 531 are squeezed by the tapered inclined surface 613 so as to deform inwardly and store a resilient restoring force. After the press arms 531 completely pass through the corresponding positioning hole 61, the restoring force of the press arms 531 is released so that the press arms 531 can press against the outer surface of the second frame 6. Moreover, a peripheral edge of each of the entry opening 611 and the exit opening 612 is arcuate formed, so that when each fastener 5 is assembled to the second frame 6, friction between each fastener 5 and the second frame 6 can be prevented and plastic shavings due to friction can be avoided.

In sum, through the aforesaid structures of the backlight module of this disclosure and the frame device thereof, the heat dissipating seat 14 and the cover 16 of the conventional backlight module can be dispensed herewith, so that not only the number of the components and the cost of manufacturing of the backlight module of this disclosure can be reduced, but also the border of the backlight module can be narrowed, the scope of the area thereof can be enlarged, and the heat dissipation effect can be enhanced. Therefore, the object of this disclosure can be achieved.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment. Various features, aspects, and exemplary embodiments have been described herein. The features, aspects, and the exemplary embodiments are susceptible to combination with one another as well as to variation and modification, as will be understood by those having skill in the art.

This disclosure is not limited to the disclosed exemplary embodiments but is intended to cover various arrangements included within the spirit and scope of the broadest interpretation so as to encompass all such modifications and equivalent arrangements.

What is claimed is:

1. A frame device for a backlight module comprising:
   a first frame including a base wall and a side wall extending from said base wall;
   a plurality of fasteners disposed on said side wall; and
   a second frame assembled to said first frame and having a plurality of spaced-apart positioning holes,
   wherein a portion of each of said fasteners passes out of a respective one of said positioning holes and presses against said second frame when said second frame is assembled to said first frame, and
   wherein each of said fasteners includes a fixing portion, and said side wall of said first frame is provided with a plurality of limiting grooves, each of which has a shape corresponding to that of said fixing portion, said fixing portion of each of said fasteners being inserted into a respective one of said limiting grooves to position each of said fasteners to said side wall of said first frame.

2. The frame device as claimed in claim 1, wherein said fasteners are integrated as one piece with said first frame.

3. The frame device as claimed in claim 1, wherein each of said fasteners further includes an insert inserted into the respective one of said positioning holes, and a press portion that is connected to said insert, that passes out of the respective one of said positioning holes, and that presses against said second frame.

4. The frame device as claimed in claim 3, wherein said insert includes two spaced-apart insert portions, and each of said fasteners further includes a connecting portion connected to and cooperating with said insert portions to define a groove with a substantially U-shaped cross section.

5. The frame device as claimed in claim 4, wherein said fixing portion of each of said fasteners is disposed beneath and connected to said connecting portion.

6. The frame device as claimed in claim 5, wherein said fixing portion of each of said fasteners is formed with a passage hole, said side wall of said first frame being further provided with a plurality of protruding blocks, each of which projects into said passage hole of said fixing portion of a respective one of said fasteners.

7. The frame device as claimed in claim 3, wherein said press portion includes two press arms that extend downwardly and respectively from said insert portions to press against said second frame.

8. The frame device as claimed in claim 1, wherein said positioning holes of said second frame are located above said side wall and does not engage said side wall, and at least a portion of a lower end of each of said positioning holes is contacting with an upper surface of said side wall.

9. A backlight module comprising:
  a light bar;
  a light guide plate for receiving light emitted from said light bar; and
  a frame device including:
    a first frame including a base wall and a side wall extending transversely from one end of said base wall;
    said light bar and said light guide plate being received in said first frame;
    a plurality of fasteners disposed on said side wall opposite to said base wall; and
    a second frame assembled to said first frame and having a plurality of spaced-apart positioning holes,
  wherein a portion of each of said fasteners passes out of a respective one of said positioning holes and presses against said second frame when said second frame is assembled to said first frame,
  wherein each of said fasteners is capable of moving in a first direction prior to assembly of said second frame to said first frame, and the first direction is a direction extending along the thickness direction of said side wall of said first frame, and
  wherein said light bar is connected to said side wall such that each of said fasteners is restricted by said light bar and said side wall to prevent movement of each of said fasteners.

10. The backlight module as claimed in claim 9, wherein said fasteners are integrated as one piece with said first frame.

11. The backlight module as claimed in claim 9, wherein each of said fasteners includes an insert inserted into the respective one of said positioning holes, and a press portion that is connected to said insert, that passes out of the respective one of said positioning holes, and that presses against said second frame.

12. The backlight module as claimed in claim 11, wherein said insert includes two spaced-apart insert portions, and each of said fasteners further includes a connecting portion connected to and cooperating with said insert portions to define a groove with a substantially U-shaped cross section.

13. The backlight module as claimed in claim 12, wherein an upper end of said light bar is lower than an upper end of said side wall to define an accommodation space for accommodating said connecting portions of said fasteners.

14. The backlight module as claimed in claim 11, wherein said press portion includes two press arms that extend downwardly and respectively from said insert portions to press against said second frame.

15. The backlight module as claimed in claim 12, wherein each of said fasteners further includes a fixing portion disposed beneath and connected to said connecting portion, said side wall of said first frame being provided with a plurality of limiting grooves, each of which has a shape corresponding to that of said fixing portion, said fixing portion of each of said fasteners being inserted into a respective one of said limiting grooves to position each of said fasteners to said side wall of said first frame.

16. The backlight module as claimed in claim 15, wherein said fixing portion of each of said fasteners is formed with a passage hole, said side wall of said first frame being further provided with a plurality of protruding blocks, each of which projects into said passage hole of said fixing portion of a respective one of said fasteners.

17. The backlight module as claimed in claim 9, wherein each of said fasteners is restricted by said side wall from freely moving in any direction.

18. The backlight module as claimed in claim 9, wherein said positioning holes of said second frame are located above said side wall and does not engage said side wall, and at least a portion of a lower end of each of said positioning holes is contacting with an upper surface of said side wall.

* * * * *